D. A. HOPKINS.
Journal Bearing.
No. 235,435.          Patented Dec. 14, 1880.
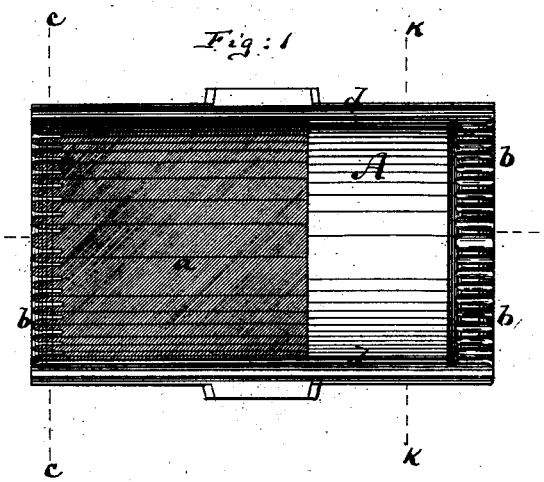
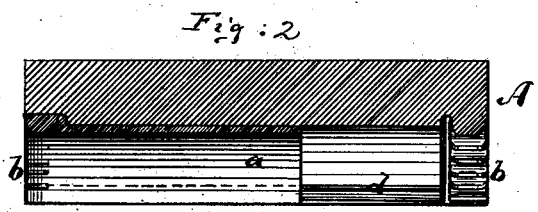
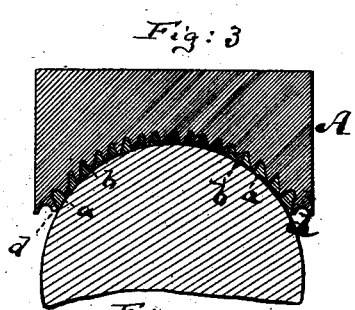
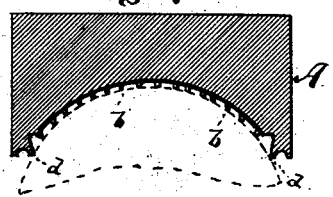
Witnesses:
W. H. C. Smith.
John C. Tunbridge
Inventor:
David A. Hopkins
by his attorney
A. v. Briesen
N. PETERS, PHOTO-LITHOGRAPHER, WASHINGTON, D. C.

UNITED STATES PATENT OFFICE.

DAVID A. HOPKINS, OF PARK RIDGE, NEW JERSEY.

JOURNAL-BEARING.

SPECIFICATION forming part of Letters Patent No. 235,435, dated December 14, 1880.

Application filed May 6, 1879.

*To all whom it may concern:*

Be it known that I, DAVID A. HOPKINS, of Park Ridge, in the county of Bergen and State of New Jersey, have invented a new and Improved Journal-Bearing for Railway-Cars, of which the following is a specification.

The object of my invention is to prevent the undue spreading and partial escape from its proper position of the very soft metal used as a lining for journal-bearings on their journal side to provide a yielding surface or mold, into which the journal to which the bearing is applied embeds and fits itself under pressure, without preventing or essentially interfering with said embedding and self-fitting process, and to avoid the disastrous heating and "cutting" of journals which frequently follows the moderate heating of journals having Babbitt-lined bearings and the melting out of the Babbitt-metal lining, and as a consequence the concentration of the whole load upon the hard-metal flanges by which the Babbitt metal was surrounded, which present to the journal too small an amount of bearing-surface to admit the cool running of the journal thereon, and are yet so strong and hard that they cannot be crushed down to permit the journal to reach and bear upon the large part of the hard-metal bearing inclosed by them.

To this end my said invention consists in the construction of the journal side of journal bearings or shells that are to be lined or filled with a relatively soft weak metal with weak projecting flanges or ridges for confining said soft metal within desirable limits, said flanges being, as a rule, located at or near the outer edges of the bearing or shell, and in all cases made so weak as to be quickly crushed down or bent over in case of the load placed upon the bearing being to any great extent concentrated upon them, and in grooving out or cutting away the bearing or shell immediately adjoining said flanges, so as to leave a space or form a receptacle into which the metal of which said ridges are composed may be crushed or forced until the journal rests upon that part of said bearing or shell inclosed by them, said flanges being in all cases made so thin and weak as not to offer effective resistance to the journal in embedding and fitting itself into said very soft metal lining by pressure, as above set forth, in case of its coming in contact with them before said embedding is completed.

In the accompanying drawings, &c., Figure 1 is a bottom view of my improved journal-bearing. Fig. 2 is a longitudinal section of the same. Figs. 3 and 4 are cross-sections of the same, taken on the planes of the lines *c c* and *k k*, Fig. 1, respectively.

The bearing A is lined on the lower side with said soft yielding metal *a*. Ribs or projections *b* project downward from the bearing at or near the ends of the bearing. They should, as a rule, project so far as to nearly or quite touch the journal by the time it has fairly embedded itself in said soft metal.

Between the ribs *b b* are grooves, into which said ribs can be crushed by the load-pressure at the time the journal fits itself to the bearing.

*d* are ribs or flanges which extend downward along the sides of the journal side of the bearing. Parallel to and on the outer side of each flange *d* is a groove or depression (not lined) adapted to receive the metal of said ribs *d*, of the harder material of which the body of the bearing is formed, if said ribs are crushed down. The flanges *d* and their outer grooves may be continued across the ends of the bearing, instead of the ribs or flanges *b* at the ends of the bearing, and in many cases the flanges and their grooves at the ends of the bearings may be dispensed with altogether, because excessive spreading and escape from its proper position of said soft-metal lining often occurs at the sides of the bearing, but not to any considerable extent at its ends, thus making end flanges not as necessary as side flanges.

Instead of providing grooves for the reception of the metal of said flanges, so that they may be forced down to such extent as to admit of the journal reaching that part of said hard-metal bearing inclosed by them, the metal outside of said flanges may be, as a whole, cut away, so that the same result would be obtained as by grooving upon the outside of said flanges.

A very large part of the benefit of my invention may be realized by omitting said grooves and simply making said flanges weak, as herein described, so that in case of the journal coming in contact with them before having properly embedded itself in said soft lining by pressure, such embedding will not be prevented thereby, the grooving or cutting away of the bearing to form recesses for receiving the metal of which said flanges is comprised being of use only in case of the melting out of said soft-metal lining, or of the Babbitt lining, when used.

Flanges made as above may, when desired, be located at points between the flanges herewith shown along the sides of the bearing.

Heretofore bearings or shells constructed with flanges for the purpose of retaining soft-metal or Babbitt-metal linings in place have not been grooved out or cut away at or near the base of the flanges, so as to provide a space or receptacle into which the metal of which they were composed could be forced in case of their being crushed down, so as to permit the journal to come in contact with and bear upon that part of the bearing or shell constituting the cavity for receiving said lining and inclosed by said flanges, and said flanges have been made so thick and strong as to effectually resist and prevent being crushed down or bent over to any considerable extent, even in case of said lining being melted out, although presenting to the journal so small an amount of bearing-surface for contact therewith as to render its cool running after such melting out impossible.

I claim—

1. A journal-bearing constructed with flanges $d\ d$ on its journal side, in combination with a soft yielding lining, $a$, between the flanges, said journal-bearing having a non-lined portion outside of said flanges, all arranged so that in case of the journal coming in contact with the flanges during the process of its embedding and fitting itself into said lining said flanges will be readily crushed down or bent over upon the non-lined portion of the bearing to permit such embedding to go forward.

2. A journal-bearing constructed with series of readily-crushed ribs or projections $b$ on its journal side, and with intervening grooves that are filled with a yielding lining, $a$, substantially as described.

DAVID A. HOPKINS.

Witnesses:
W. G. E. SCHULTZ,
F. V. BRIESEN.